(12) United States Patent
Lozier et al.

(10) Patent No.: US 11,117,099 B2
(45) Date of Patent: Sep. 14, 2021

(54) METHOD OF CLEANING MICROFILTRATION AND ULTRAFILTRATION MEMBRANES

(71) Applicant: Gwinnett County Board of Commissioners, Lawrenceville, GA (US)

(72) Inventors: James C. Lozier, Tempe, AZ (US); J C Lan, Lawrenceville, GA (US); Justin I. Garmon, Lawrenceville, GA (US); Robert L. Harris, Jr., Lawrenceville, GA (US); Srinivas Jalla, Duluth, GA (US); Korkud Egrican, Bethesda, MD (US)

(73) Assignee: GWINNETT COUNTY BOARD OF COMMISSIONERS, Lawrenceville, GA (US)

( * ) Notice: Subject to any disclaimer, the term of this patent is extended or adjusted under 35 U.S.C. 154(b) by 307 days.

(21) Appl. No.: 15/133,008

(22) Filed: Apr. 19, 2016

(65) Prior Publication Data

US 2017/0296974 A1 Oct. 19, 2017

(51) Int. Cl.
*B01D 65/02* (2006.01)
*C11D 7/10* (2006.01)
(Continued)

(52) U.S. Cl.
CPC .............. *B01D 65/02* (2013.01); *C11D 7/10* (2013.01); *C11D 7/268* (2013.01); *B01D 61/145* (2013.01); *B01D 61/147* (2013.01); *B01D 71/34* (2013.01); *B01D 2311/12* (2013.01); *B01D 2321/04* (2013.01); *B01D 2321/162* (2013.01); *B01D 2321/168* (2013.01); *C02F 1/444* (2013.01)

(58) Field of Classification Search
CPC .... B01D 61/16; B01D 61/145; B01D 61/147; B01D 65/02; B01D 71/34; B01D 2311/04; B01D 2311/12; B01D 2321/04; B01D 2321/162; B01D 2321/168; C02F 1/444; C11D 7/10; C11D 7/268
See application file for complete search history.

(56) References Cited

U.S. PATENT DOCUMENTS

| | | | |
|---|---|---|---|
| 2005/0224411 A1 | 10/2005 | Gallagher et al. | |
| 2007/0138092 A1* | 6/2007 | Smith | B01D 29/66 210/636 |

(Continued)

OTHER PUBLICATIONS

Zhang, Zhengua, et al., "Cleaning Strategies for Iron-Fouled Membranes from Submerged Membrane Bioreactor Treatment of Wastewaters," Journal of Membrane Science; (2015) vol. 475 pp. 9-21.

(Continued)

*Primary Examiner* — Benjamin L Lebron
(74) *Attorney, Agent, or Firm* — Kutak Rock LLP

(57) ABSTRACT

A system for and method of cleaning polymeric and ceramic microfiltration and ultrafiltration membranes in hollow fiber, flat sheet, and tubular membrane units is provided. The method includes using a reducing agent, specifically ascorbic acid, based formulation. The method also includes certain protocols useful in conducting such cleanings. The system includes features for facilitating the method of the present invention.

12 Claims, 4 Drawing Sheets

(51) Int. Cl.
    *C11D 7/26*         (2006.01)
    *B01D 61/14*      (2006.01)
    *B01D 71/34*      (2006.01)
    *C02F 1/44*       (2006.01)

(56) References Cited

U.S. PATENT DOCUMENTS

| | | | |
|---|---|---|---|
| 2009/0127212 A1* | 5/2009 | Muller | B01D 61/145 |
| | | | 210/798 |
| 2014/0124441 A1* | 5/2014 | Ikeda | B01D 65/02 |
| | | | 210/636 |

OTHER PUBLICATIONS

Zhenghua Zhang, et al., Cleaning strategies for iron-fouled membranes from submerged membrane bioreactor treatment of wastewaters, Journal of Membrane Science 475 (2015); Ref. .pdf pp. 51-63.

V.R. Ambikadevi and Lilithambika, M. Effect of organic acids on ferric iron removal from iron-stained kaolinite, Applied Clay Science, Elsevier (200); Ref. .pdf pp. 64-65.

Ascorbic treatment to rid pools of metal stains Iron stains. Discussion thread started in Aug. 2007 at Troublefreepool.com. http://troublefreepool.com/threads/2129-Ascorbic-Treatment-to-rid-Pool-of-metal-stains (2009); Ref. .pdf pp. 66-73.

* cited by examiner

METHOD OF CLEANING MICROFILTRATION AND ULTRAFILTRATION MEMBRANES

FIELD OF THE INVENTION

The present invention relates generally to a method for cleaning polymeric and ceramic microfiltration (MF) and ultrafiltration (UF) membranes and membrane units. More specifically, the present invention relates to using a reducing agent, such as ascorbic acid, to clean membranes and to certain protocols useful in conducting such cleanings.

BACKGROUND OF THE INVENTION

Polymeric and ceramic membranes are used for a variety of water treatment applications including groundwater and surface water filtration, brackish and sea water desalination, and reclamation and reuse of industrial and municipal wastewaters. Properties of the membranes vary depending on the material, manufacturing process, and morphology of the membranes.

Different membranes can be used for specific separation processes, including MF, UF, nanofiltration (NF), and reverse osmosis (RO), all of which use differential pressure to produce water flow and retain water contaminants. MF and UF use membranes having targeted pore sizes (or pore size distributions) to retain particles, colloids, and large molecules. As a general rule, MF can filter particles down to 0.1 micron ($\mu$m), whereas UF can retain particles as small as 0.01 $\mu$m and smaller by physical sieving at the membrane surface and/or retention with the membrane matrix. MF and UF membranes also can retain large colloidal material and dissolved organic molecules by methods other than physical sieving (e.g., electrostatic attraction). In contrast, NF and RO membranes are designed to retain soluble contaminants using different mechanisms.

As the size of the particles to be retained decreases, the pore size of the membrane must decrease and the pressure required to carry out the separation and produce water flux must increase proportionally.

The rate of water flow is directly proportional to the membrane surface area. Where a large volume water flow is needed, as is typically required for municipal and industrial filtration applications, using MF and UF membranes packaged in a form that provides high packing density or filtration surface per unit volume is preferred. One known method to achieve high packing density is to formulate the membrane in the shape of a hollow porous fiber and then assemble a large number of fibers into a module.

Microporous polymeric hollow fiber membranes typically are produced by phase inversion (separation) techniques, including temperature-induced phase separation (TIPS) and non-solvent induced phase separation (NIPS). Hollow fibers also can be manufactured by coating a hollow support matrix (e.g., woven polyester) with the polymer.

Microporous hollow fiber membranes are particularly well suited for the removal of colloidal suspensions, turbidity, and pathogenic organisms, including bacteria and protozoa. UF membranes with pore sizes less than 0.02 $\mu$m also provide a high level of virus removal.

UF and MF membranes are used in separating particles and colloidal matter from liquids. In a typical scenario, water containing solutes and precipitates is passed through a bank of membranes housed in a module, often at elevated pressures. The filtered water (containing solutes) is drawn off and collected, leaving a residue of solid material in the membrane pores or on the feed side of the membrane.

It is preferred that the pores of the membrane be kept relatively free of contaminants. As the amount of pore blockage increases, the filtration efficiency of the module decreases and the amount of pressure required to maintain viable throughput of liquid increases. As pressure increases, the cost of energy required for filtration increases and the amount of filtrate production decreases, significantly increasing the cost of filtration.

Under some circumstances, it may be desirable to treat water containing impurities with a flocculating agent prior to filtration. The purpose of flocculating agents is to cause dispersed colloids to coagulate and form 'flocs.' Flocs have the advantage of entrapping smaller colloidal particles, thereby making filtration more efficient. They may also aid in the removal of dissolved particles, most notably dissolved organic compounds that are subject to adsorption on or enmeshment in the floc. Under the influence of a flocculating agent, dissolved and suspended particles coagulate and precipitate from the water, thereby removing color and turbidity.

Thus, in practice, the filtrate containing the flocculating agents, colloids, bacteria, and other particulate matter is passed through the filtration unit under pressure, expelling filtered water and leaving the floc trapped within the unit, and more particularly on the waste side of the membrane and in the pores of the membrane. Depending on the flocculating agent used, flocs are particularly problematical in causing membrane blockage, and membrane performance gradually diminishes with use until it becomes necessary to clean the membranes.

One of the most commonly employed flocculating agents in the water purification field is ferric chloride (or its variant salt, ferric sulfate), and the resultant floc is known as ferric floc. Build-up of ferric floc leads to iron fouling and eventually results in membrane performance degradation that reduces water production and membrane life, increasing membrane unit cost. Two of the most widely used membrane compositions, polyvinylidene fluoride (PVDF) and polyethersulfone (PES), can foul irreversibly with ferric floc, requiring premature replacement.

Several methods are employed for removing foulants, including ferric floc, that accumulate in and on the membrane. These include backwashing (with and without air scour), chemically enhanced backwash (CEB), maintenance clean (MC), and clean-in-place (CIP). Unfortunately, these cleaning regimes have not been highly effective in cleaning PVDF (and other microporous) membranes of the resultant ferric floc, leading to significant commercial costs associated with ultimate irreversible membrane fouling by metal oxides and/or hydroxides. Consequently, it would be beneficial to improve these existing cleaning regimes and/or to develop new, more effective cleaning regimes.

Backwashing, also called backpulsing, generally involves passing filtrate through the fiber wall in the opposite direction of filtration to hydraulically displace foulants from the membrane pores and membrane surface. Backwashing, however, is only partially effective for foulant removal and has been shown to provide incomplete removal of ferric flocs or oxidized iron. The application of coarse or fine bubbles applied to the feed side of the membrane in a turbulent flow regime, termed air scour, is often used in conjunction with, or in place of, backwashing to enhance the efficiency of foulant removal. Unfortunately, even with air scour, backwashing still provides unsatisfactory results.

CEB involves adding chemicals to filtrate during backwash followed by a period of static contact between the solution and the membrane. MC, on the other hand, involves adding chemicals to filtrate and recirculating or soaking the resulting chemical solution across the feed side of the membrane (and in some cases through the membrane wall), followed by a period of static soak. Where acid-based chemicals are used, CEB and MC are more effective than backwashing alone for ferric floc and oxidized iron removal; however, such removal is not complete. In some instances, ethylenediaminetetraacetic acid (EDTA) is used in conjunction with high pH in order to remove the deposited iron through chelation; however, such prior art methods continue to provide unsatisfactory results.

CIP is similar to MC; however, chemical solution strength(s) are greater, soak times are longer, and in some cases, the chemical solution is heated prior to application. CIP efficiency for ferric floc and oxidized iron removal is greater than for MC; however, removal efficiency is strongly dependent on the hydraulics employed during the cleaning cycle and the solution temperature utilized. Consequently, even CIP fails to provide satisfactory results.

In many cases, at least some of the prior art methods' failure to provide adequate cleaning is attributable to the solutions employed by such prior art methods. Citric acid is usually regarded as a satisfactory cleaning agent for the removal of oxidized metal deposits and inorganic metal-based flocs, including ferric flocs, and is most widely used for this purpose. However, citric acid does not provide an ideal level of cleaning, and membrane performance diminishes even following regular use/cleaning cycles. Moreover, the cleaning process usually involves a number of steps, and one or more of the steps may need to be conducted for long periods of time. Temperature control also is usually required.

Citric acid often is used in combination with an inorganic acid (hydrochloric or sulfuric) to reduce the cost of citric use; however, this requires additional chemical storage and dosing equipment, as well as more precise chemical control to ensure the chemical solution pH does not exceed the pH limit of the membrane and cause damage. Inorganic acids and bases, and certain organic acids, most notably citric acid, are the mainstay of conventional microporous membrane cleaning agents. Hence, there exists the need to improve the cleaning regime while at the same time avoiding the use of potentially severe cleaning agents.

SUMMARY OF THE INVENTION

The present invention comprises a system for and methods of overcoming or ameliorating at least one of the disadvantages of the existing methods of de-fouling microporous membranes in order to provide a more effective alternative to conventional cleaning methods, while avoiding potential membrane damage.

In a preferred embodiment, the method of the present invention includes utilizing a fluid composition to clean contaminants from a membrane. In some embodiments, the fluid composition includes a reducing agent and a compatible solvent. In some such embodiments, the reducing agent is ascorbic acid. The term "ascorbic acid" is used herein in its broadest general sense and includes, without limitation, ascorbic acid, sodium ascorbate, and/or any other available forms of ascorbate salts and/or other forms of ascorbic acid, whether now known or later discovered and/or developed. In some embodiments, the reducing agent is supplemented by an enhancing agent. In some such embodiments, the enhancing agent includes an inorganic and/or an organic acid to optimize cleaning efficiency. In some embodiments, the enhancing agent and/or the reducing agent is an inorganic reducing agent.

Some embodiments of the present inventive concept are ideal for cleaning microporous membranes, such as those having a hollow fiber configuration, a flat sheet configuration, or a tubular configuration (either single tubes or multi-tube monolith), or other membrane configuration. In some embodiments, the present invention is ideal for cleaning polyvinylidene fluoride (PVDF) polymer membranes, although the systems and methods of the preferred embodiments are applicable to polysulfone, polyethersulfone, polyethylene, polypropylene, polyacrylonitrile (PAN), fluorinated membranes, cellulose acetate membranes, and the like, as well as mixtures of the above and all commonly used membrane polymers. Furthermore, the preferred embodiments are also applicable to inorganic membranes formed from oxides of aluminum, titanium, zirconium, and silicon, as well as from silicon carbide.

In some embodiments, the reducing agent, such as an ascorbic acid reducing agent, is in the form of a granule or powder. In other embodiments, the reducing agent is in a salt form. In some such embodiments, the reducing agent includes sodium ascorbate and/or some other combination that includes alkali metals and/or alkaline earth metals. In still other embodiments, where available and advantageous for ease of membrane cleaning, the reducing agent is in liquid form.

In some embodiments, ascorbic acid is present in an amount of 0.5 to 5 percentage weight to volume when dissolved in the solute. It will be appreciated, however, that various embodiments of the present invention employ various suitable dilution percentages.

In some embodiments, a contaminant, such as ferric floc, other form of ferric precipitate, and/or other metal precipitate, is removed by solubilization. In some such embodiments, such solubilization is the result of a reduction to a lower valence state of at least a part of the contaminant.

In some embodiments, the method of the present invention reduces the cleaning time relative to known cleaning methods. In some such embodiments, the method of the present invention is carried out at low or ambient temperatures. In other such embodiments, the method of the present invention is carried out at elevated temperatures (up to and including the maximum allowable temperature of the membrane material being cleaned) to improve cleaning efficiency.

In some embodiments, a method of the present invention includes contacting the contaminant with a solution that includes a reducing agent, such as ascorbic acid, and a solvent, in which the reducing agent is soluble in the solvent, and wherein the solvent is compatible with the membrane. In other embodiments, a method of the present invention includes contacting the contaminant with a solution that includes a reducing agent, an enhancing agent, and a solvent, in which the reducing agent and the enhancing agent are each soluble in the solvent, and wherein the solvent is compatible with the membrane.

In some embodiments, a reducing agent, an enhancing agent, and/or a solvent is selected based on the properties of the contaminant to be removed. In some such embodiments, the contaminant includes a metal oxide or a metal hydroxide. In other such embodiments, the contaminant includes ferric floc or other form of precipitated or oxidized iron. In still other embodiments, the contaminant includes aluminum floc or other form of precipitated or oxidized aluminum. In yet other such embodiments, the contaminant includes any form or precipitated or oxidized manganese. In still yet other such embodiments, the contaminant includes one or more organic compounds.

In some embodiments, the solvent includes water. In other embodiments, the solution includes ascorbic acid, sodium ascorbate and/or other ascorbate salt. In still other embodiments, the solution includes an enhancing agent. In some such embodiments, the enhancing agent includes an inorganic acid. In other such embodiments, the enhancing agent includes an inorganic reducing agent, such as sodium bisulfite, sodium metabisulfite, sodium hydrosulfite, or a mixture thereof. In still other such embodiments, the enhancing agent includes citric acid.

In some embodiments, the method of the present invention includes the step of reducing a valence state of an atom of a contaminant to a lower valence state, which allows the contaminant to be solubilized and removed from the membrane.

Various embodiments of the present invention are configured for one or more membrane configurations. Some such embodiments are configured for membranes that include a hollow fiber MF membrane or a hollow fiber UF membrane. Other such embodiments are configured for membranes that include a tubular MF membrane or a tubular UF membrane. Still other such embodiments are configured for membranes that include a flat sheet MF membrane or a flat UF membrane. Yet other such embodiments are configured for membranes that include a polyvinylidene fluoride or polyethersulfone polymer.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
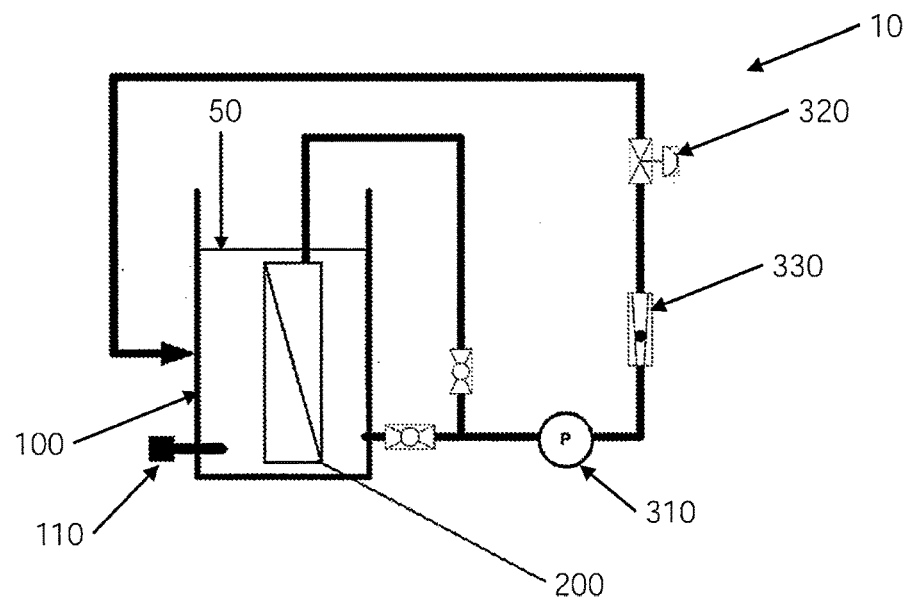
FIG. 1 illustrates a schematic of the submerged MF/UF module cleaning system configuration.
Figure 2:
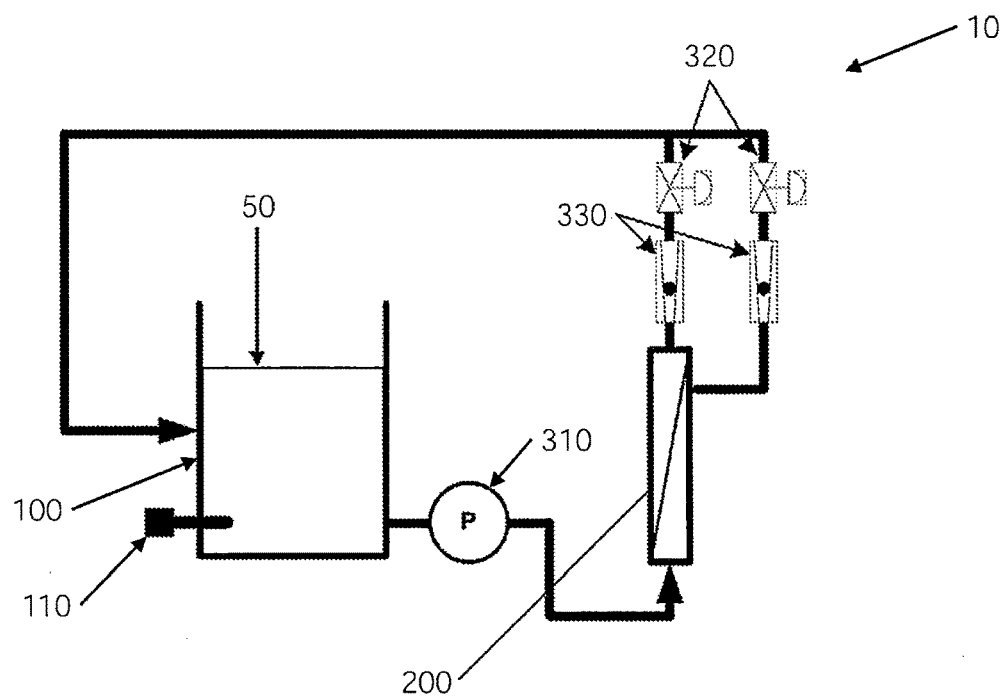
FIG. 2 illustrates a schematic of the pressurized MF/UF module cleaning system configuration.

The system 10 of the present invention includes a tank 100 that is configured to hold a volume of fluid 50. In some embodiments, the system 10 is configured to clean polymeric and/or ceramic microfiltration (MF) and/or ultrafiltration (UF) membranes, such as hollow fiber, flat-sheet, and/or tubular membranes, and/or membrane units/modules 200. Referring to FIG. 1, some embodiments of the system 10 are Clean-In-Place ("CIP") systems and/or are configured to operate while the module 200 is submerged. Referring to FIG. 2, other embodiments of the system 10 are CIP systems and/or are configured to operate while the module is pressurized.

In some embodiments, the system 10 includes one or more heater 110 for introducing heat energy into the volume of fluid 50 for the purpose of raising the fluid temperature. In other embodiments, the system 10 further includes one or more pump 310, flow control valve 320, and/or flowmeter 330 in fluid communication with the volume of fluid 50.

Referring to FIG. 1, some methods of the present invention comprise positioning a module 200 fully within the tank 100 so as to submerge the module 200 in the volume of fluid 50. In this way, fluid from the volume of fluid 50 is allowed to flow against and/or into the membranes contained in the module, thereby allowing the fluid to come into contact with contaminants (not shown) so as to dissolve and/or otherwise break-up the contaminants. In some such embodiments, a low-pressure end of the pump 310 is in fluid communication with the module 200 so as to enable the pump 310 to draw fluid from the module 200. In this way, fluid from the volume of fluid 50 is allowed to continually flow past the contaminants, into the module, and back out of the module, carrying the dissolved and/or otherwise broken-up portions of the contaminants away from the module 200.

Referring to FIG. 1, an alternative method of the present invention comprise positioning a module 200 fully within the tank 100 so as to submerge the module 200 in the volume of fluid 50. In this way, fluid from the volume of fluid 50 is allowed to flow against and/or into the membranes contained in the module, thereby allowing the fluid to come into contact with contaminants (not shown) so as to dissolve and/or otherwise break-up the contaminants. In this embodiment, a low-pressure end of the pump 310 is in fluid communication with the tank 100 so as to enable the pump 310 to draw fluid from the tank 100. In this way, fluid from the volume of fluid 50 is allowed to continually flow past the contaminants, across the surface of the membranes within the module, and back into the tank 100, carrying the dissolved and/or otherwise broken-up portions of the contaminants away from the module 200.

Referring to FIG. 2, other methods of the present invention comprise connecting the tank 100 to the module 200 such that a high pressure end of the pump 310 is in fluid communication with the module 200 so as to allow the pump 310 to force fluid from the volume of fluid 50 through the module 200. In this way, fluid from the volume of fluid 50 is allowed to continually flow through the module 200 so as to dissolve and/or otherwise break-up contaminants without requiring the module to be removed from its normal place of operation. In this embodiment, fluid from volume of fluid 50 can flow through the membranes contained in the module, across the surface of the membranes contained in the module, or both.

In some embodiments, the volume of fluid consists of a solution that includes a solvent and one or more additives, such as a reducing agent and/or an enhancing agent. In some embodiments, the solution composition includes 0.5 to 5.0 wt. % ascorbic acid. In other embodiments, the solution composition includes 0.5 to about 5.0 wt. % sodium ascorbate or other ascorbate salt. In still other embodiments, the solution composition includes 0.5 to 5.0 wt. % ascorbic acid and an inorganic acid to adjust the solution pH to between 1.5 and 3.5. In yet other embodiments, the solution composition includes 0.5 to 5.0 wt. % sodium ascorbate or other ascorbate salt and an inorganic acid to adjust the solution pH to between 1.5 and 3.5. In still yet other embodiments, the solution composition includes 0.5 to 5 wt. % ascorbic acid and 0.5 to 2.0 wt. % sodium bisulfite, sodium metabisufite, or sodium hydrosulfite. In yet other embodiments, the solution composition includes 0.5 to 5.0 wt. % sodium ascorbate or other ascorbate salt, and 0.5 and 2.0 wt. % sodium bisulfite, sodium metabisulfite, or sodium hydrosulfite.

Some embodiments of the present invention are particularly well-suited for PVDF membranes. In some such embodiments, ascorbic acid is used as a cleaning agent on PVDF membranes, alone or in conjunction with one or more enhancing agent, to remove contaminants such as metal oxides and/or metal hydroxides.

Ascorbic acid generally is available as a solid material (powder or granules), and must first be dissolved in a solvent prior to use as a membrane cleaning agent. In some embodiments, the ascorbic acid is diluted to as low as 0.5 wt. %. In other embodiments, the ascorbic acid is diluted to around 1 to 2 wt. %.

In some embodiments, the present invention obtains commercial importance by allowing membranes that are subject to ferric floc fouling and that have suffered significant declines in water permeability and water production to be cleaned, and thereby have their capacity restored and life extended. In some such embodiments, operation at higher flux and water production and lower transmembrane pressure is achieved. This is particularly advantageous with submerged membrane applications where, for practical purposes, transmembrane pressure is limited to 11 pounds per square inch (psi).

In some embodiments of the present invention, a cleaning methods facilitate running ferric floc applications at a higher flux because such embodiments facilitate quick and efficient cleaning of fouled membranes. In other embodiments, more efficient removal of the ferric floc facilitates membrane permeability at higher levels, resulting in longer membrane life. Both higher flux and longer life translate into a significant commercial advantage.

Some methods of preferred embodiments can be used in conjunction with CEB, MC, and CIP.

The methodology for conducting a CEB, MC, or CIP depends on the configuration of the membrane system. Where a pump is used to pressurize the feed and create a positive feed-to-filtrate differential pressure across the membrane, and where the membranes are encased in a pressure vessel, the membrane system is referred to as a pressurized system. Where a pump is used to create a vacuum on the filtrate side of the membrane and create a negative feed-to-filtrate differential pressure via vacuum, the membrane system is referred to as a submerged or immersed system.

In some embodiments, pressurized membrane system CEB is conducted by injecting cleaning chemical into the filtrate during backwash, followed by a soak period. In other embodiments, pressurized system MC and CIP are conducted by mixing cleaning chemicals in a tank and then recirculating the solution across the feed side of the membrane and back to the tank for a given period of time, followed by a soak period, and in some instances ending with a second recirculation period. In some embodiments, feed-side recirculation is conducted by recirculating from feed port to concentrate port, from concentrate port to feed port, or in an alternating or sequential arrangement. In some embodiments, during recirculation, a portion of the cleaning solution is allowed to permeate the membrane and be directed back to the tank in order to enhance reduction and solubilization of the ferric floc or oxidized metals.

In some embodiments, the membranes are contacted with the solution at ambient temperature. In some such embodiments, depending upon the temperature of the filtrate and temperature of the atmosphere in which the filtrate is stored, the solution temperature ranges from 1 to 40 degrees Celsius (° C.). In other embodiments, the membranes are contacted with the solution at elevated temperature. In some such embodiments, depending upon the allowable temperature at which the membranes can be contacted with the solution, the solution temperature ranges from 15 to 95° C.

In some embodiments, CEB and MC typically are conducted using ambient temperature solution. In other embodiments, CIP is conducted using heated solution, depending on the ambient temperature of the filtrate. In some embodiments, higher cleaning solution temperatures are used to increase dissolution and displacement of solids compared to cleaning at ambient temperature. In other embodiments, longer soak and/or recirculation times are used to compensate, in part or in whole, for cleanings conducted at ambient temperature.

In some embodiments, vacuum system membrane CEB is conducted by injecting a cleaning chemical into the filtrate during backwash, but with the tank in which the membranes are housed drained of feed. Following backwash and a pre-determined soak period, the tank is re-filled with feed and the membranes contacted with diluted cleaning chemical for a given soak period. In some such embodiments, coarse bubble aeration is applied intermittently during the soak period to agitate the membrane fibers and to mix the cleaning solution. CEB and MC are, in most cases, synonymous with vacuum systems. In other embodiments, the CEB is conducted by injecting a cleaning chemical into the filtrate during backwash, but with the tank in which the membranes are housed filled with feed.

In some embodiments, vacuum membrane system CIP is conducted in a manner similar to CEB but with stronger chemical solutions and with longer soak periods. In other arrangements, a pump is used to recirculate cleaning solution between the membrane tank and a tank used to prepare cleaning solution (feed recirculation mode). In alternative configurations, the permeate pump is used to draw cleaning solution through the membrane and recirculate back to the membrane tank (permeate recirculation mode). In most instances, filtrate used during the backwash sequence of CIP is not heated, as the benefits of heating are limited once the tank is filled with unheated feed.

In some embodiments, conducting CIP with a vacuum membrane system includes removing a membrane array (rack or cassette) from the membrane tank and inserting it into a 'dip' tank. In some such embodiments, the dip tank is equipped with a heater, permeate pump, coarse air supply system, and/or a means to add cleaning chemical to the tank, either in pre-solution or neat form. In some embodiments, use of the dip tank provides a means to conduct CIP using heated solutions, and with both feed and permeate recirculation.

Once the cleaning is completed, the cleaning solution is flushed from the membranes, membrane modules, and membrane system before returning the membranes to service by reconnecting to the normal fluid flow.

In some embodiments, CIP is carried out manually or by means of fully automated systems that activate in response to pressure differentials, rate of trans-membrane pressure (TMP) increase, and/or after predetermined module operating times.

In some embodiments, cleaning solution containing ascorbic acid or ascorbate salt, alone or in conjunction with one more enhancing agents, is used with both pressurized and vacuum membrane systems using any or all of the CEB, MC, and CIP configurations described herein.

In some embodiments of the present invention, the membranes are cleaned with a 2% ascorbic acid solution at 40 degrees Celsius. In some such embodiments, the membrane is allowed to soak in the solution for ten to twelve hours.

Test Results

Bench scale membrane cleaning study results comparing the effectiveness of various methods are summarized in Table 1, below, with reducing agent percentages representing percentage weight to volume. Tests were conducted by soaking single fiber test specimens in static solutions ("static soak") having either ascorbic acid, sodium metabisulfite ("SBS"), a proprietary cleaning solution ("Avista 127"), or citric acid. Each test specimen had an average (plus or minus approximately 25%) initial "pre-clean" permeability of approximately 17.2 gallons per square foot per day ("GFD") per pound per square inch ("psi"). Permeability was measured (with a certainty of approximately plus or minus 15%) after approximately 6 hours and/or 24 hours.

TABLE 1

Post Clean Permeability Resists (Avg. Pre-clean Permeability = 17.2 GFD/psi)

| No. | Sample ID | Temperature | Permeability (GFD/psi) 6 Hours | Permeability (GFD/psi) 24 Hours |
|---|---|---|---|---|
| 1 | 0.5% Ascorbic Acid | Ambient | 26.6 | 26.9 |
| 2 | 1% Ascorbic Acid | Ambient | 24.6 | 36.5 |
| 3 | 0.5% Ascorbic Acid | Heated to 35° C. | 29.3 | 33.9 |
| 4 | 1% SBS | Ambient | 17.7 | 19.8 |
| 5 | 2% SBS | Ambient | 20.1 | 20.8 |
| 6 | 1% Avista 127 | Ambient | 20.2 | 26.6 |
| 7 | 1.5% Avista 127 | Ambient | | 28.2 |
| 8 | 2% Avista 127 | Ambient | | 41 |
| 9 | 2% Avista 127 (w/vacuum) | Ambient | | 40.8 |
| 10 | 0.5% Avista 127 (w/vacuum) | Heated to 35° C. | | 55.1 |
| 11 | 0.2% Avista 127 (w/vacuum) | Heated to 35° C. | | 51.6 |
| 12 | 1% Citric Acid* | Ambient | 26.1 | 26.4 |
| 13 | 1% Citric Acid* | Heated to 35° C. | 26.2 | 26.7 |

Based on the bench scale cleaning study results, an enhanced recovery clean (RC) protocol was developed to test the effectiveness of ascorbic acid and Avista 127 cleaning agents on full-scale UF cassettes using the two existing dip tanks. Two trains (identified as UF Trains 4 and 12) were selected for the enhanced RC. In preparation, both trains were first cleaned using a standard hypochlorite recovery clean protocol (600 mg/L chlorine followed by 2% citric acid). The trains were placed in supervisory mode before and after RC to allow operation at fixed permeate flow. Table 2, below, lists the operating parameters (with a certainty of approximately plus or minus 15%) that were recorded prior to and following the standard hypo RC.

TABLE 2

Operating Parameters Before and After Standard Hypochlorite RC

| | UF Train #4 - Avista 127 | | UF Train #12 - Ascorbic Acid | |
|---|---|---|---|---|
| Operating Parameters | Before hypochlorite Clean | After hypochlorite Clean | Before hypochlorite Clean | After hypochlorite Clean |
| Feed Water Temperature (in ° C.) | 26.2 | 24.4 | 26.2 | 24.4 |
| Permeate Flow (in gpm) | 1,625 | 1,630 | 1,625 | 1,629 |
| Membrane Flux (in gfd) | 20.00 | 20.06 | 20.00 | 20.05 |
| Transmembrane Pressure, TMP (psi) | 4.65 | 3.13 | 3.4 | 2.51 |
| Temperature Corrected Permeability (@ 20° C. in gfd/psi) | 3.71 | 5.77 | 5.07 | 7.19 |

When in supervisory mode, train permeate flow was maintained near 1,625 gpm flow in order to match the membrane flux that could be achieved when individual cassettes were operated in the dip tanks based on the rated flow capacity of the dip tank permeate pumps (125 gpm @40 ft TDH). However, the dip tank permeate pumps were able to deliver only 70 gpm and consequently, the transmembrane pressure (TMP) recorded during the Enhanced RCs could not be compared with those exhibited during supervisory mode operation. Table 3, below, summarizes the chemical concentrations & cleaning conditions used when the Enhanced RCs were conducted with thirteen cassettes from each of the two trains (Trains 4 & 12). Hydrochloric acid ("HCl"/"muriatic acid") was used to adjust pH of Avista 127, as necessary.

TABLE 3

Enhanced Recovery Cleaning Summary for UF Trains 4 and 12

| UF Train # | Cassette #s | Chemical and Weight (dry) | Weight (dry-lbs) | Solution pH[1] | Dip Tank | Cleaning Duration (hrs) | Temp. |
|---|---|---|---|---|---|---|---|
| 4  | 1       | 0.2 wt % Avista 127   | 70  | 3.0-3.5 | A | 24 | >35° C. |
| 4  | 2 & 3   | 0.2 wt % Avista 127   | 70  | 3.0-3.5 | A | 11 | >35° C. |
| 4  | 4 & 5   | 0.2 wt % Avista 127   | 70  | 3.0-3.5 | A | 11 | >35° C. |
| 4  | 6 & 7   | 0.2 wt % Avista 127   | 70  | 3.0-3.5 | A | 11 | >35° C. |
| 4  | 8 & 9   | 0.2 wt % Avista 127   | 70  | 3.0-3.5 | A | 11 | >35° C. |
| 4  | 10 & 11 | 1 wt % Avista 127     | 350 | 3.0-3.5 | A | 11 | >35° C. |
| 4  | 12 & 13 | 1 wt % Avista 127     | 350 | 3.0-3.5 | A | 11 | >35° C. |
| 12 | 1       | 2 wt % Ascorbic Acid  | 700 | 3.0-3.5 | B | 24 | >35° C. |
| 12 | 2 & 3   | 2 wt % Ascorbic Acid  | 700 | 3.0-3.5 | B | 11 | >35° C. |
| 12 | 4 & 5   | 2 wt % Ascorbic Acid  | 700 | 3.0-3.5 | B | 10 | >35° C. |
| 12 | 6 & 7   | 2 wt % Ascorbic Acid  | 700 | 3.0-3.5 | B | 10 | >35° C. |
| 12 | 8 & 9   | 2 wt % Ascorbic Acid  | 700 | 3.0-3.5 | B | 10 | >35° C. |
| 12 | 10 & 11 | 2 wt % Ascorbic Acid  | 700 | 3.0-3.5 | B | 10 | >35° C. |
| 12 | 12 & 13 | 1 wt % Ascorbic Acid  | 350 | 3.0-3.5 | B | 10 | >35° C. |

Permeability tests were conducted on fiber samples collected from various cassettes in UF Trains 4 (Avista 127) and 12 (Ascorbic Acid). The samples were coded to ensure no bias was introduced when the permeability of the cleaned fibers was measured. Table 4, below, summarizes the permeability results (with a certainty of approximately plus or minus 15%).

TABLE 4

Post Enhanced Recovery Clean Permeability Test Results

| Chemical | % wt. | Cassette # | Module # | Cassette in Batch Solution | Cleaning Time (hrs) | Fiber Location | Permeability (GFD/psi)* |
|---|---|---|---|---|---|---|---|
| Ascorbic Acid | 2.0% | 1  | 1  | 1$^{st}$ | 24 | Edge   | 45.8 |
|               |      |    | 19 |          |    | Middle | 45.1 |
|               | 2.0% | 5  | 1  | 2$^{nd}$ | 10 | Edge   | 55.0 |
|               |      |    | 19 |          |    | Middle | 41.1 |
|               | 2.0% | 6  | 1  | 1$^{st}$ | 10 | Edge   | 51.0 |
|               |      |    | 19 |          |    | Middle | 54.0 |
|               | 1.0% | 13 | 1  | 2$^{nd}$ | 10 | Edge   | 47.8 |
|               |      |    | 19 |          |    | Middle | 54.0 |
| Avista 127    | 0.2% | 1  | 1  | 1$^{st}$ | 24 | Edge   | 21.4 |
|               |      |    | 19 |          |    | Middle | 41.1 |
|               | 0.2% | 5  | 1  | 2$^{nd}$ | 11 | Edge   | 33.6 |
|               |      |    | 19 |          |    | Middle | 43.6 |
|               | 0.2% | 6  | 1  | 1$^{st}$ | 11 | Edge   | 21.5 |
|               |      |    | 19 |          |    | Middle | 67.3 |
|               | 1.0% | 11 | 1  | 2$^{nd}$ | 11 | Edge   | 35.8 |
|               |      |    | 19 |          |    | Middle | 52.8 |

*Permeability result for a single fiber harvested from the designated UF cassette.

As shown in Table 1, the permeability results associated with ambient temperatures with static soak using 1% wt ascorbic acid and Avista 127 were measured at 36.5 GFD/psi and 26.6 GFD/psi, respectively. The dip tank cleans with heating and permeate recirculation resulted in average permeabilities of 50.9 GFD/psi (Cassette #13 in Train 12) and 44.3 GFD/psi (Cassette #11 in Train 14).

As shown in the above tables:

1. Cassettes cleaned with 1 or 2% ascorbic acid had more uniform permeabilities (<20% difference between fibers from edge and middle modules). Cassettes cleaned with 0.2 and 1% Avista 127 showed significantly greater permeability variability (approx. 2 fold difference)/

2. Longer cleaning time did not result in significant improvement in permeability (see permeability of fibers from Cassette #1, cleaned for 24 hours vs. Cassette #6, cleaned for less than 12 hours). However, the 24-hr ascorbic acid clean did result in more uniform clean across the cassette (approx. 45 gfd/psi across the cassette)

3. Reducing ascorbic acid concentration to 1% had no discernable impact on cleaning effectiveness. (Compare Cassette #13 permeability to that from Cassettes #1, #5 and #6.)

4. Increasing Avista 127 concentration to 1% resulted in more uniform permeability (Cassette #11). However, uniformity was less than with ascorbic acid (compare Cassettes #11 and #13.)

5. Ascorbic acid cleaning effectiveness is not diminished when the solution is used to clean a second cassette (Cassettes #5, #6, & #13)

Full scale performance testing of two trains (Trains 4 and 12) was conducted to quantify the effectiveness of the enhanced RCs in both restoring and maintaining train permeability. Avista 127 was used with the first train (Train #4) and ascorbic acid was used with the second train (Train #12). A third train (Train #8) was selected as a control train (only cleaned with standard hypo and citric acid RC solutions). Each train is represented in the charts of FIGS. 3 and 4.

Figure 3:
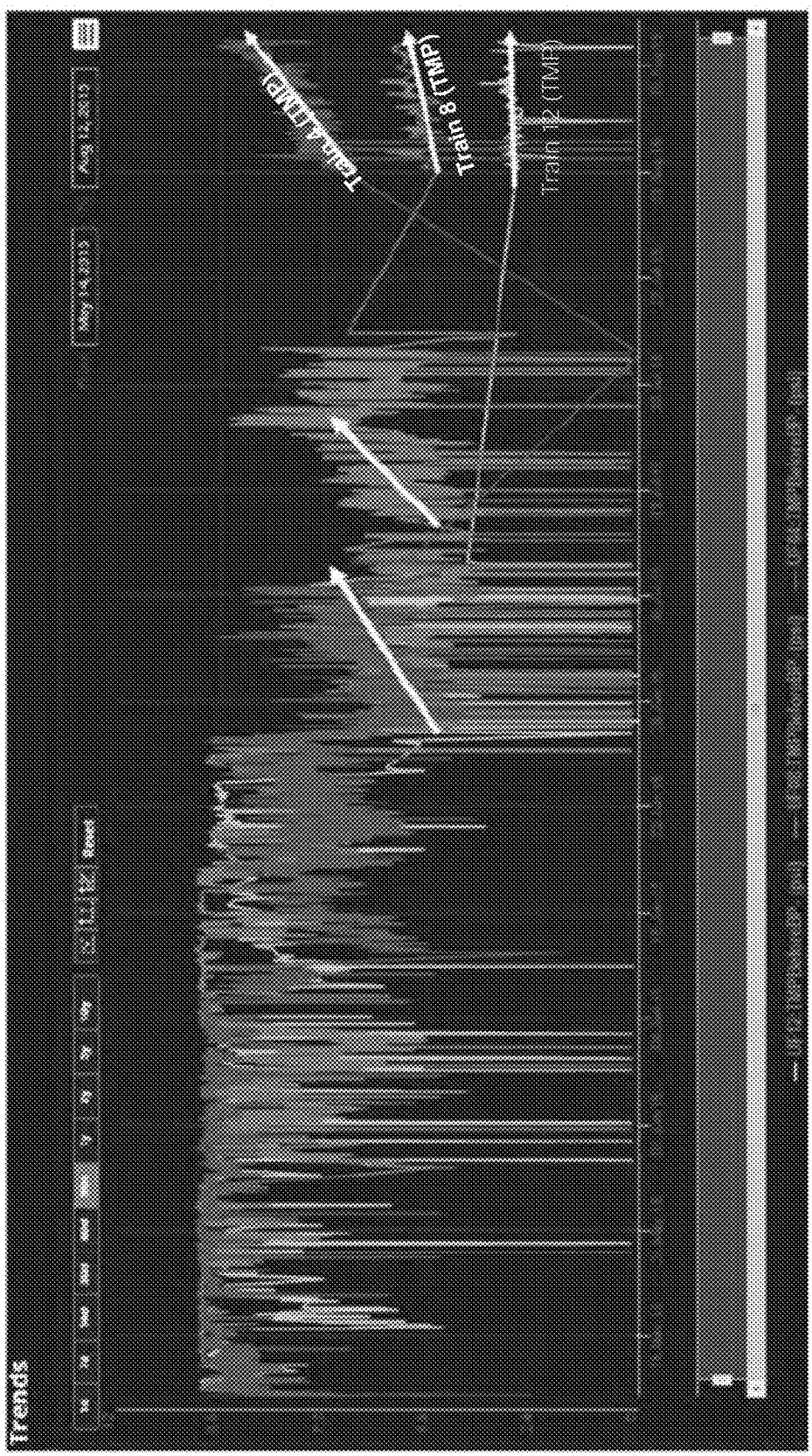
FIG. 3 is a chart showing a 90-day Trend of Before Backpulse Trans-membrane Pressure ("TMP") of an Avista 127 train (Train 4), a control train (Train 8), and an ascorbic acid train (Train 12).
Figure 4:
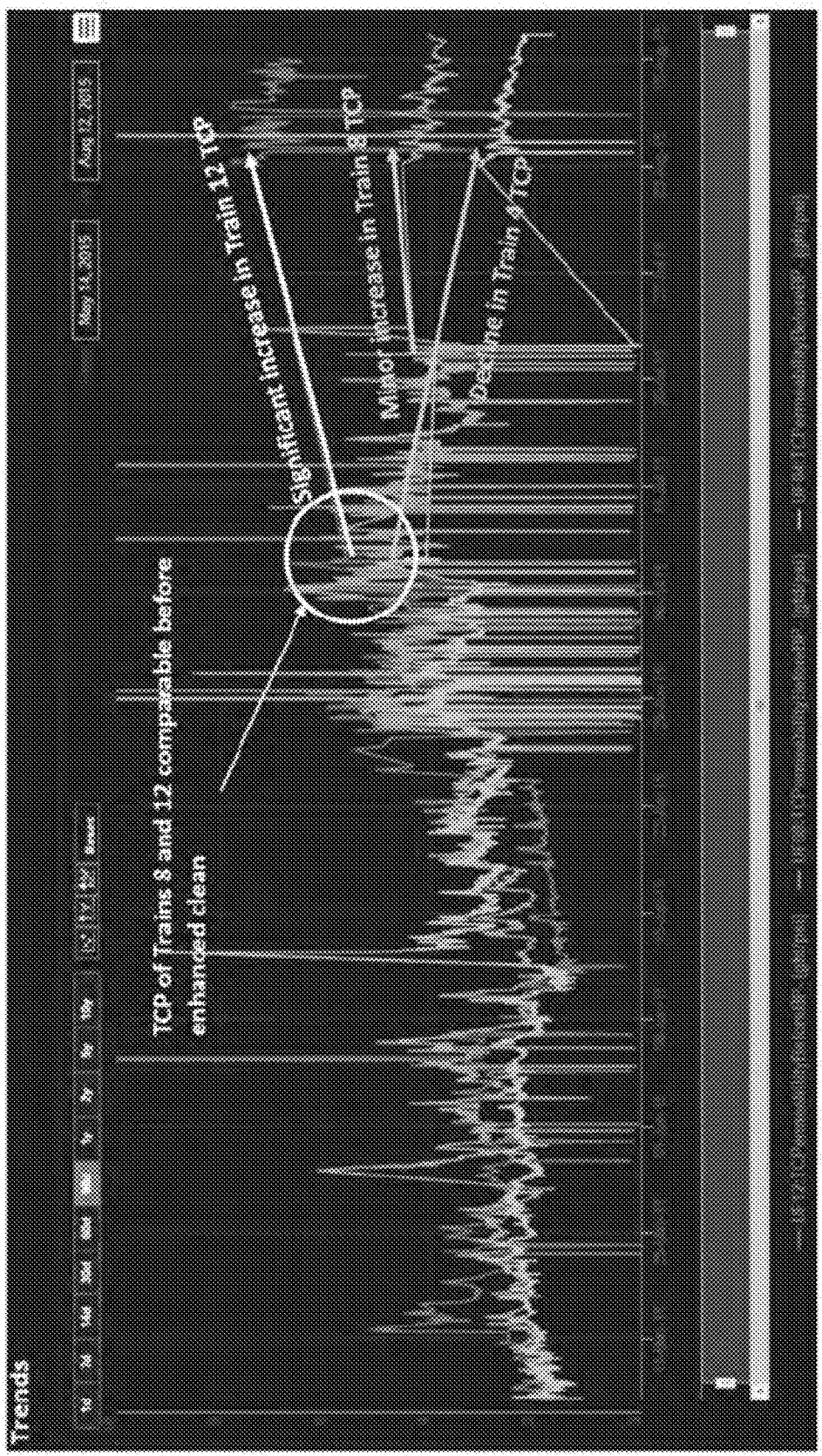
FIG. 4 is a chart showing a 90-day Trend of Before Backpulse Temperature Corrected Permeability ("TCP") of an Avista 127 train (Train 4), a control train (Train 8), and an ascorbic acid train (Train 12).

Based on the trends shown on FIGS. 3 and 4, the Trans-membrane Pressure ("TMP") is significantly lower and the temperature-corrected permeability ("TCP") significantly higher for Train 12 cleaned with 2%/1% ascorbic acid compared with TMP and TCP for Train 4 cleaned with 0.2%/1% Avista 127. Surprisingly and unexpectedly, Train 4 TCP is lower than the control train (Train 8) that has not undergone an enhanced RC. The following conclusions can be drawn from the trends for these three trains:

1. Cleaning with ascorbic acid increased Train 12 TCP by nearly 100% (compared to control Train 8).
2. TMP of Train 12 following the ascorbic acid clean is much more stable than that of the control train.
3. Operation at fixed flux results in more stable permeability and TMP for all trains An additional single fiber cleaning trial was conducted to evaluate the ability of 2% citric acid to restore cassette permeability. Results from the single fiber cleaning trials showed poor permeability improvements for citric acid (see Table 1). Consequently, the use of citric acid for future Enhanced RCs was dismissed. Also, the results for Citric Acid cleaned single fibers (see Table 1) from the bench scale cleaning study did not support the data trends observed for Train 8 during the performance testing.

Figure 5:
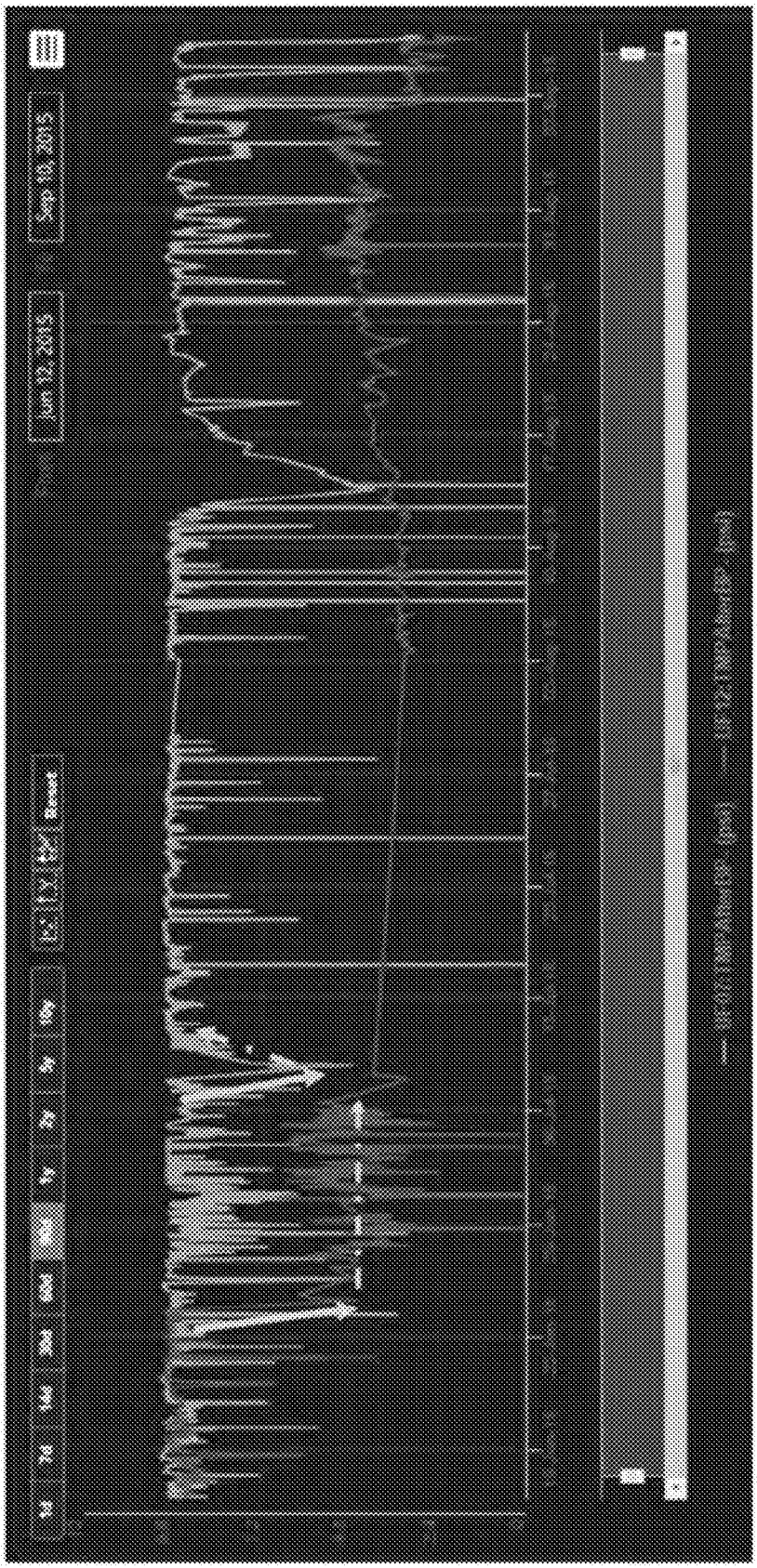
FIG. 5 is a chart showing a 90-day Trend of Before Backpulse Transmembrane Pressure.

Performance testing for Train 12 was extended beyond 14-days in order to see when the TMP rise rate would match the control train and what TMP would result at the end of the 30-day filtration cycle (before a standard RC is conducted). Given the low observed TMP rise rate and sustained permeability, the Train 12 permeate flow was increased to 2,500 gpm (while in supervisory, fixed flow mode) to evaluate the impact of higher flux operation on TCP and TMP rise rate. Based on the low TMP readings shown in FIG. 5, it is clear that cleaning the Train 12 cassettes using the Enhanced RC protocol (10 hours of permeate recirculation with heated 2% ascorbic acid solution at pH~3) provides excellent and sustained permeability restoration.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall there between.

What is claimed is:

1. A method of increasing the permeability of a membrane contaminated with a contaminant, the method comprising:
   immersing the membrane into a tank containing a solution, wherein the solution is brought into direct contact with the contaminant, and
   continually flowing the solution past the contaminant and across the surface of the membrane within the tank,
   wherein the membrane contaminated with a contaminant has an initial permeability of approximately 17.2 gallons per square foot per day per pound per square inch ("GFD/psi") plus or minus approximately 25%,
   wherein the solution comprises a solvent that is compatible with the membrane,
   wherein the solution comprises 1%-2% (w/v) ascorbic acid or salt thereof as a reducing agent that is soluble in the solvent,
   wherein the contaminant is not contacted with sodium hypochlorite, and
   wherein the permeability of the membrane is increased to at least 36.5 gallons per square foot per day per pound per square inch ("GFD/psi") after continually flowing the solution past the contaminant and across the surface of the membrane within the tank.

2. The method of claim 1, wherein the solution pH is between 1.5 and 3.5.

3. The method of claim 1, wherein the solution further comprises an inorganic acid.

4. The method of claim 1, wherein the solution further comprises between 0.5 percentage weight to volume and 2.0 percentage weight to volume of one of sodium bisulfite, sodium metabisulfite, and sodium hydrosulfite.

5. The method of claim 1, wherein the solution is at ambient temperature.

6. The method of claim 5, wherein the ambient temperature is between one degree Celsius and forty degrees Celsius.

7. The method of claim 1, further comprising heating the solution to an elevated temperature prior to bringing the solution into direct contact with the contaminant.

8. The method of claim 7, wherein the elevated temperature is between fifteen degrees Celsius and ninety-five degrees Celsius.

9. The method of claim 7, further comprising maintaining the solution at the elevated temperature for an extended period of time while the solution is in direct contact with the contaminant.

10. The method of claim 9, wherein the extended period of time is between ten hours and twelve hours.

11. The method of claim 1, wherein the contaminant comprises ferric floc.

12. The method of claim 1, further comprising maintaining the solution in contact with the contaminant at a temperature of about 35 degrees Celsius for an extended period of time, wherein the extended period of time is between approximately ten hours and twelve hours.

* * * * *